United States Patent
Chen

(10) Patent No.: US 7,543,455 B1
(45) Date of Patent: Jun. 9, 2009

(54) SOLAR-POWERED REFRIGERATOR USING A MIXTURE OF GLYCERIN, ALCOHOL AND WATER TO STORE ENERGY

(76) Inventor: Chengjun Julian Chen, 2 Canfield Ave., Apartment 811, White Plains, NY (US) 10601

( * ) Notice: Subject to any disclaimer, the term of this patent is extended or adjusted under 35 U.S.C. 154(b) by 0 days.

(21) Appl. No.: 12/135,113

(22) Filed: Jun. 6, 2008

(51) Int. Cl.
*F25B 27/00* (2006.01)
(52) U.S. Cl. ............... 62/235.1; 62/59; 62/434
(58) Field of Classification Search ......... 62/235.1, 62/59, 434–435, 440–441
See application file for complete search history.

(56) References Cited

U.S. PATENT DOCUMENTS

| | | | |
|---|---|---|---|
| 1,954,304 A * | 4/1934 | Weems | 62/156 |
| 1,969,187 A * | 8/1934 | Schutt | 165/236 |
| 2,077,982 A * | 4/1937 | Bixby et al. | 62/337 |
| 4,280,335 A * | 7/1981 | Perez et al. | 62/332 |
| 4,984,628 A * | 1/1991 | Uchida et al. | 165/256 |
| 5,666,817 A * | 9/1997 | Schulak et al. | 62/185 |
| 6,253,563 B1 * | 7/2001 | Ewert et al. | 62/235.1 |
| 7,051,543 B2 * | 5/2006 | Trujillo et al. | 62/201 |
| 2001/0041210 A1 * | 11/2001 | Kauffeld et al. | 426/590 |

* cited by examiner

*Primary Examiner*—William E Tapolcai

(57) ABSTRACT

A solar-powered refrigerator is disclosed. It uses a solar photovoltaic panel to convert solar energy to electricity to power a DC motor. The DC motor drives the compressor of a vapor-compression refrigeration system to freeze an energy-storage vessel, located in the freezer. The energy-storage vessel is filled with a mixture of glycerin, alcohol and water, with a freezing point of 10° F. to −10° F. In the absence of sunlight, the temperature of the frozen mixture can maintain near its freezing point for more than one day. The temperature of the refrigerator is maintained to a desirable value, for example 37° F., by a pair of heat-exchange coils and a thermostat, with or without sunlight.

6 Claims, 3 Drawing Sheets

Side view (cross section)        Front view with doors open

FIG 2A. Side view (cross section)

FIG 2B. Front view with doors open

SOLAR-POWERED REFRIGERATOR USING A MIXTURE OF GLYCERIN, ALCOHOL AND WATER TO STORE ENERGY

BACKGROUND OF THE INVENTION

Refrigerators and freezers in residential homes consume a large amount of energy, typically 13% of total energy consumption. It is the third largest user of energy in a residential building following space heating/cooling and water heating. Typically, a kitchen refrigerator consumes 500 to 700 kWh annually. In some regions in the United States, for example, New York, the average cost of electricity is $0.22 per kWh. The annual cost of electricity is $110 to $154. As the price for solar cells is dropped to $1 per watt, the use of solar-powered refrigerators is becoming economically advantageous.

On the other hand, the power grid is not always reliable. A severe thunderstorm, a blizzard, an average-intensity hurricane, or a breakdown of any part of a power grid will interrupt the supply of electricity. Once this occurs, the foodstuff in refrigerators starts to deteriorate. Therefore, refrigerators based on solar energy, if realized, should have a higher reliability. In regions without power grid, for example, remote areas in many countries, especially in developing countries, solar-powered refrigerators are the best option.

Refrigerators powered by solar photovoltaic cells have been used in regions without grid electricity, for example, to preserve immunizations in Africa. A central problem of solar-powered refrigerators is that solar energy is not continuous day and night. Refrigerators designed with very tight insulation, with backup batteries, or with variable-speed compressors to accommodate weak power sources have been proposed. However, those designs still have a huge fluctuation of cooling power due to the diurnal variation of solar energy because of the lack of energy storage capabilities.

BRIEF SUMMARY OF THE INVENTION

The current invention discloses a novel design of solar-powered refrigerator which uses an phase-transition energy-storage medium inside the refrigerator with a freezing point between −10° C. to −20° C. (approximately 10° F. to −10° F.). The entire refrigeration system comprises a photovoltaic panel to convert solar radiation to electricity, which is used to drive a compressor for a vapor-compression refrigerator. In the presence of sunlight, the photovoltaic panel provides cooling power to freeze the energy-storage medium. In the absence of sunlight, the frozen energy-storage medium keeps the temperature basically constant by releasing the latent heat at its freezing point. By using a sufficiently large thermal mass of the energy-storage medium, the refrigerator could keep the temperature basically constant for a few days even without sunlight.

However, for storing foodstuff and medicine, as a viable consumer electronics item, there are stringent requirements for the energy-storage medium. In addition to have the right freezing point, the energy-storage medium should be non-toxic, should not tend to damage the container and heat-exchange coils, and inexpensive to stay competitive with grid power and batteries. Pure water cannot function as the energy-storage medium, not only because the freezing point is too high, but the expansion in the transition from liquid to solid (ice) will damage container and heat-exchange coils.

It is known that adding glycerin could lower the freezing point of water. Glycerin has another important effect: when a water solution of glycerin starts to be frozen, leaf-shaped ice sheets grow in the viscous liquid of a more concentrated glycerin solution. The entire liquid-solid continuum is soft and fluid. It does not damage the container and heat-exchange coils. However, the effectiveness of glycerin to lower the freezing temperature of water is relatively weak. On the other hand, alcohol, especially methanol, has a strong effect of lowering the freezing point of water. However, using alcohol alone, when the liquid is being frozen, solid pieces of ice is formed, which may damage the container and the heat-exchange coils.

Experimentally it was found that an aqueous solution of 10% to 40% of glycerin and 5% to 10% of alcohol has the ideal property for an energy storage system. The freezing temperature matched well with the freezer in a refrigerator. The ice is in a shape of thin sheets. The mixture, after freezing, is still fluid.

Glycerin and alcohol are non-toxic. Glycerin can be used as food and external medicine for soothing the skin. Alcohol is safe as well. Therefore, if the container of the energy-storage medium leaks inside the refrigerator, it does not create any health hazard. Especially, since both can be intermixed with water, it can be washed away easily.

The most significant advantage of glycerin is its cost. Glycerin is the byproduct of biodiesel production process. For each ton of biodiesel, about 150 kilograms of raw glycerin is produced. The worldwide production of raw glycerin is about 1 million ton annually. The raw glycerin contains 60% to 90% of pure glycerin, with water and alcohol as the main impurities. Although pure (99.5%) glycerin is useful for many branches of industry, the purification process is very expensive. While the price of purified glycerin (99.5%) could be $1200 per metric ton, raw glycerin costs $0-$150 per metric ton, depending on quality. However, for the application in solar-powered refrigerator, which will be mixed with water and alcohol anyway, those impurities are not a problem. Usually, alcohol is more expansive than raw glycerin. However, the quantity required is smaller. Furthermore, because both glycerin and alcohol are non-reactive, the container could be made of thin steel plates, aluminum, or ordinary plastics. Therefore, the total cost of producing the energy-storage system is low.

A typical kitchen refrigerator has two cabinets: a freezer and a cooler. The freezer typically operated in a low temperature, such as −10 to −20° C. The cooler typically operated in a moderate temperature, such as +2 to +7° C. The temperature of the freezer of the solar-powered refrigerator is fixed by the composition of the energy-storage medium, which can be changed by changing the composition. The temperature of the cooler can be adjusted by a thermostat, similar to any standard refrigerator.

DETAILED DESCRIPTION OF THE INVENTION

Figure 1:
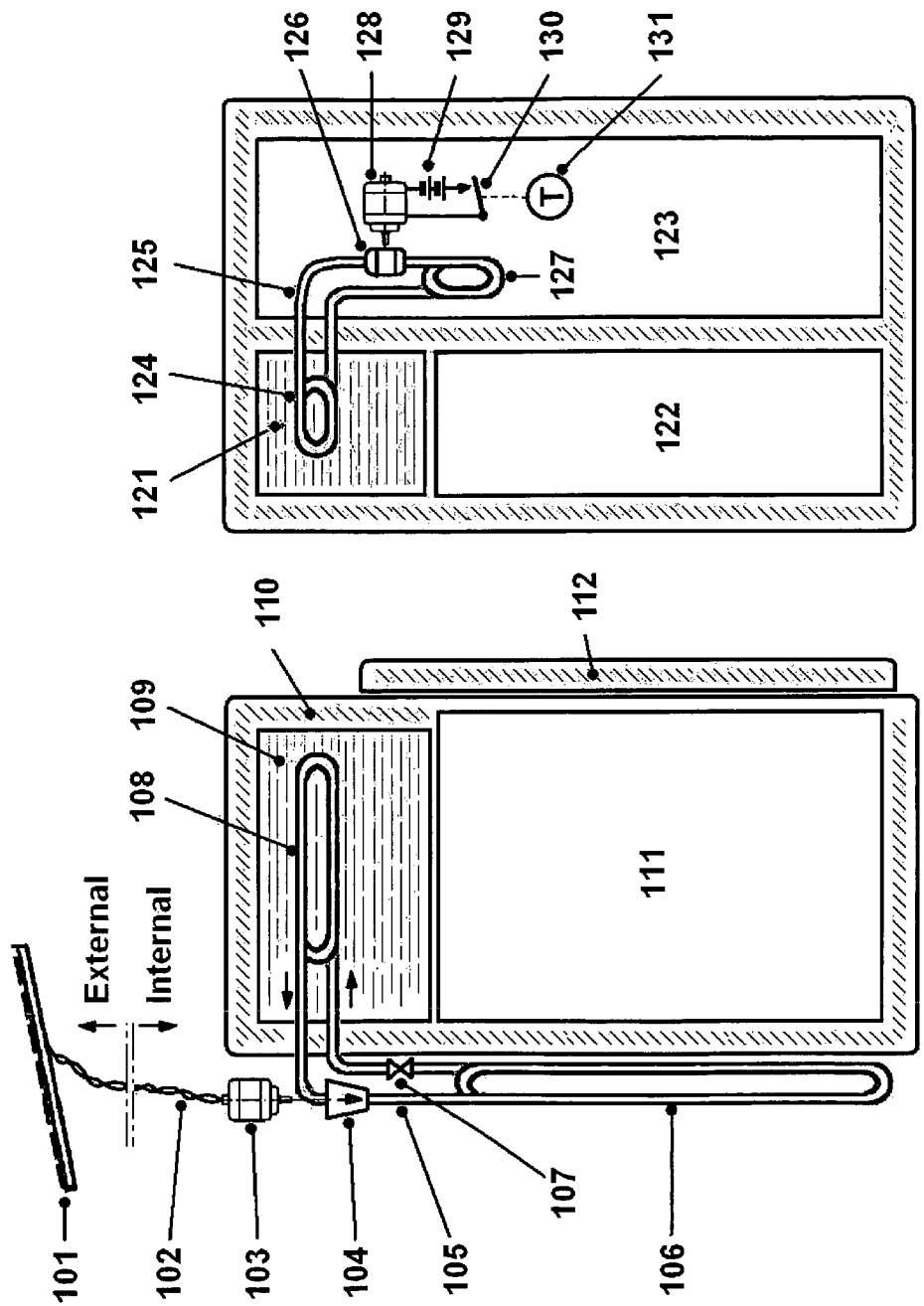
FIGS. 1A and 1B show a solar-powered side-by-side refrigerator.

FIG. 1A shows a solar-powered side-by-side refrigerator. The solar photovoltaic panel 101 is placed external to the house, typically on a south-facing roof or an awning. Through cable 102, the DC electrical current generated by the sunlight is directed to a DC motor, 103. The DC motor 103 drives a compressor 104, which compresses a refrigerant through pipe 105, and makes it hot. The condenser 106, located outside the refrigerator, disperses the heat into the air, and the refrigerant is condensed into liquid. The refrigerant is expanded through an expansion valve 107 to become cooled gas. Through a heat exchange coil 108, the gaseous refrigerant cools down the energy-storage medium 109, placed in vessel 110. The appropriate energy-storage medium 109 is typically a mixture of glycerin, alcohol and water, which has a freezing point corresponding to the desired temperature of the freezer 111. The freezer 111 is in thermal contact with the energy-storage medium 109, but protected by an insulated door 112. In the presence of sunlight, the energy-storage medium 109 is frozen into a mixture of solid and liquid, stays within a narrow temperature range determined by the freezing point of the mixture. In the absence of sunlight, the partially frozen energy-storage medium keeps the temperature fairly constant.

FIG. 1B shows a front-view of the solar-powered side-by-side refrigerator. The energy-storage medium 121, besides keeps the freezer cold, also provides cooling power to the cooler 123. A second heat exchange coil 124 is placed in the vessel of the energy-storage medium 121. The coil is filled with brine, typically a mixture of glycerin, alcohol and water with a freezing point lower than that of the energy-storage medium 121. The brine is set to move by a pump 126 into a heat exchange coil 127 driven by motor 128, powered by rechargeable battery 129. The electrical current coming through the motor is controlled by the switch, regulated by an adjustable thermostat 131. When the temperature of the cooler 123 is higher than the preset temperature, the current is turned on to set the brine in motion. When the temperature of the cooler 123 equals or becomes lower than the desired temperature, the current is turned off, and the cooling is suspended. Using such a mechanism, the temperature of the cooler is kept close to the desired temperature set by the user.

Figure 2:
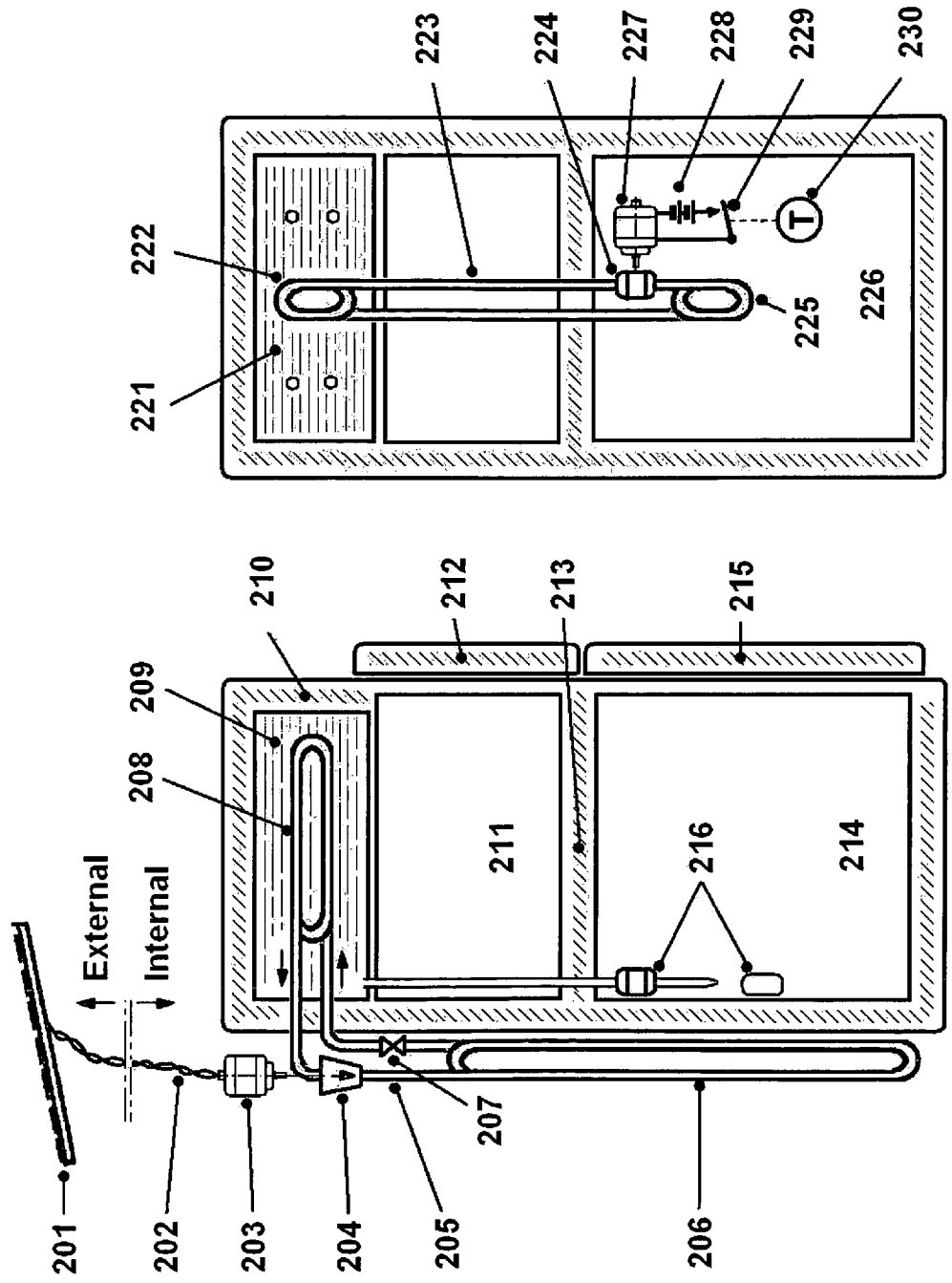
FIGS. 2A and 2B show a solar-powered upright refrigerator.

FIG. 2A shows a solar-powered upright refrigerator. Similarly, the solar photovoltaic panel 201 is placed external to the house, typically on a south-facing roof or an awning. Through cable 202, the DC electrical current generated by the sunlight is directed to a DC motor, 203. The DC motor 203 drives a compressor 204, which compresses a refrigerant through pipe 205, and makes it hot. The condenser 206, located outside the refrigerator, disperses the heat into the air, and the refrigerant is condensed into liquid. The liquidized refrigerant is led to an expansion valve 207 to become cooled gas. Through a heat exchange coil 208, the gaseous refrigerant cools down the energy-storage medium 209, contained in vessel 210. The energy-storage medium 209 in the current invention is typically a mixture of glycerin, alcohol and water, which has a freezing point corresponding to the desired temperature of the freezer 211. The freezer 211 is in thermal contact with the energy-storage medium 209, but protected by an insulated door 212. In the presence of sunlight, the energy-storage medium 209 is frozen into a mixture of solid and liquid, stays within a narrow temperature range determined by the freezing point of the mixture. In the absence of sunlight, the partially frozen energy-storage medium keeps the temperature fairly constant. The energy-storage medium 209 keeps the temperature of the freezer 211 much below the freezing point of water. It also keeps the cooler 214 at a predetermined temperature by using the thermostat and heat exchange device 216, see FIG. 2B below.

FIG. 2B shows a front-view of the solar-powered upright refrigerator with the doors opened. Inside the vessel of energy-storage medium 221, there is a second heat-exchange coil 222, filled with brine, typically a mixture of glycerin, alcohol and water with a freezing point lower than that of the energy-storage medium 221. The brine flows through pipe 223, set to move by a pump 224 into a heat exchange coil 225 inside the cooler 226. The pump 224 is driven by motor 227, powered by a rechargeable battery 228. The electrical current coming through the motor is controlled by the switch 229, regulated by an adjustable thermostat 230. When the temperature of the cooler 226 is higher than the preset temperature, the motor is turned on to set the brine in motion. When the temperature of the cooler 226 is lower than the desired temperature, the motor 227 is turned off. Using such a mechanism, the temperature of the cooler 226 is kept close to the desired temperature set by the user.

Figure 3:
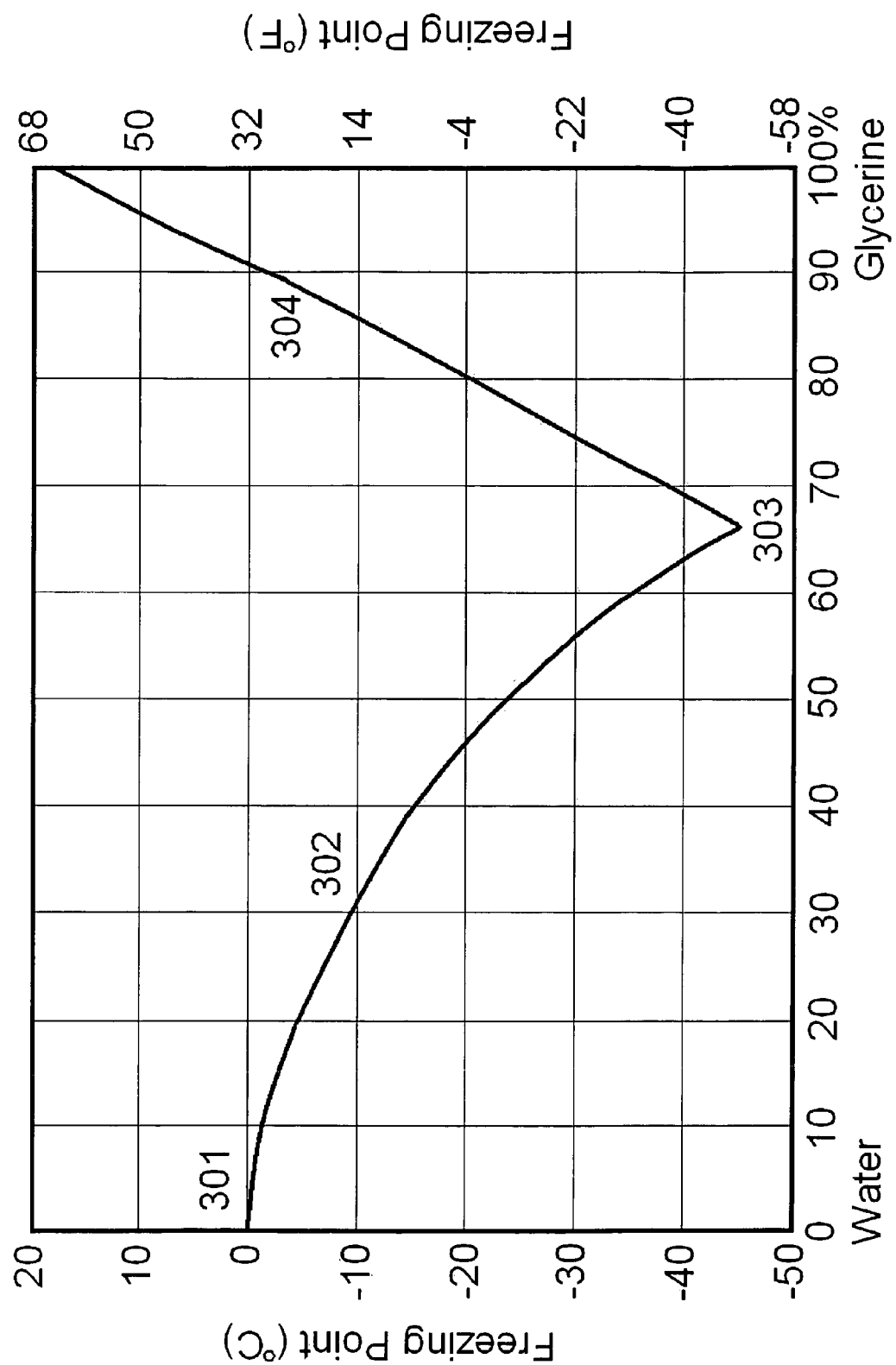
FIG. 3 shows the freezing points of mixtures of glycerin and water.

Following are the thermodynamics and experimental facts related to the apparatus. FIG. 3 is a chart of the freezing temperature of a mixture of glycerin and water. The freezing point of pure water, 301, is 0° C. or 32° F. By adding 30% of glycerin, 302, the freezing point is reduced to −10° C. or 14° F. The freezing point reaches a minimum for a mixture with 66% glycerin, at −46° C. or −50° F. The freezing point of pure glycerin, 304, according to standard literature, is 18° C. However, by cooling pure glycerin from room temperature, even down to −20° C., glycerin stays fluid. Because glycerin has very high viscosity, there is a pronounced super cooling effect. Therefore, an aqueous solution with high percentage of glycerin cannot be used for energy storage.

The more dilute aqueous solution of glycerin, near point 302 in FIG. 3, is more appropriate to be an energy storage medium. When cooled down to −20° C., a lot of thin sheets of ice start to appear. The ice sheets are lighter than the liquid, which start to accumulate neat the top of the liquid. By mixing with 5% to 10% of alcohol, the freezing point is further reduced, but the ice crystals are still in the form of thin sheets. Therefore, possible damage to the container and heat-exchange coil is minimized, and the freezing-melting process is most evenly distributed in the entire energy-storage unit.

When the temperature is lower than the nominal freezing point of the mixture, ice sheets are formed. However, the composition of the ice sheets could be different from the liquid. In general, the glycerin concentration in the ice could be less than that of the liquid, which pushes down the freezing point of the liquid. Therefore, the entire freezing process would occur at a temperature interval, instead of at a single point of temperature. However, it would not affect the operation of the refrigerator; especially the temperature of the cooler is regulated by the thermostat.

From FIG. 3 and the known fact of freezing-point depression effect of alcohol, it is clear that by increasing the concentration of glycerin and alcohol, the mixture should have an even lower freezing point. Because of the availability and low toxicity of glycerin and alcohol, it will be economically advantageous.

What is claimed is:

1. A solar-powered refrigerator comprising:

A thermally insulated box having a freezer cabinet and a cooler cabinet;

an energy-storage vessel filled with a mixture of glycerin, alcohol, and water having a freezing point of 10° F. to −10° F., located near the top of the freezer;

a solar photovoltaic panel for generating electric power from sunlight;

a DC motor driven by the electricity generated by the solar photovoltaic panel;

a vapor-compression refrigeration unit driven by the DC motor to freeze the mixture of glycerin, alcohol, and water in the energy-storage vessel;

a set of heat exchange coils filled with brine for cooling down the cooler using the cold energy stored in the energy-storage vessel;

a thermostat to activate the pump to set the brine to flow if the temperature of the cooler is higher than the set temperature.

2. The apparatus of claim 1 wherein the energy-storing mixture have 10% to 30% of glycerin and 5% to 15% of alcohol.

3. The apparatus of claim 1 wherein the alcohol comprises methanol, ethanol, isopropyl alcohol and similar alcohols.

4. The apparatus of claim 1 wherein the DC motor is controller by a thermostat to turn off the current from the solar panel if the temperature of the energy-storage vessel is lower than a preset value, for example −10° F. or −20° F.

5. The system of claim 1 wherein the cooler is cooled down by flowing air from the energy-storage vessel, and the air flow is controlled by a thermostat to set the desired temperature of the cooler.

6. The system of claim 1 wherein the electrical current of the solar photovoltaic panel is switched on to drive the motor when the voltage of the solar photovoltaic panel output is greater than a preset value, and switched off when the voltage of the solar photovoltaic panel output is smaller than another preset value.

* * * * *